(12) United States Patent
Moreth et al.

(10) Patent No.: US 7,245,504 B2
(45) Date of Patent: Jul. 17, 2007

(54) POWER DISTRIBUTION SYSTEM

(75) Inventors: Cary P. Moreth, Bloomingdale, IL (US); Edward Bulgajewski, Genoa, IL (US); Timothy A. Norris, Crystal Lake, IL (US); Erik Arnold, Gorxheimertal (DE); Laurence M. Hearn, St. Austrell Cornwall (GB); James A. Turek, La Grange, IL (US); Kenneth G. Irish, Chicago, IL (US); Michael M. Cubon, Park Ridge, IL (US)

(73) Assignee: Illinois Tool Works Inc, Glenview, IL (US)

( * ) Notice: Subject to any disclaimer, the term of this patent is extended or adjusted under 35 U.S.C. 154(b) by 628 days.

(21) Appl. No.: 10/485,677

(22) PCT Filed: Jul. 30, 2002

(86) PCT No.: PCT/US02/24065

§ 371 (c)(1),
(2), (4) Date: Jan. 29, 2004

(87) PCT Pub. No.: WO03/011630

PCT Pub. Date: Feb. 13, 2003

(65) Prior Publication Data

US 2004/0169999 A1     Sep. 2, 2004

Related U.S. Application Data

(60) Provisional application No. 60/309,011, filed on Jul. 31, 2001.

(51) Int. Cl.
*H05K 7/02* (2006.01)
*G02F 1/155* (2006.01)

(52) U.S. Cl. ............... 361/772; 361/777; 361/752; 361/803; 359/266; 359/271; 359/603

(58) Field of Classification Search ............... 361/752, 361/748, 760, 772, 775, 779, 803, 777; 359/603, 359/265–271
See application file for complete search history.

(56) References Cited

U.S. PATENT DOCUMENTS

| 5,517,003 | A | 5/1996 | Kadooka et al. | 219/548 |
|---|---|---|---|---|
| 6,195,194 | B1* | 2/2001 | Roberts et al. | 359/267 |
| 6,244,716 | B1* | 6/2001 | Steenwyk et al. | 359/603 |
| 6,583,919 | B1* | 6/2003 | Mizutani et al. | 359/266 |
| 6,657,767 | B2* | 12/2003 | Bonardi et al. | 359/265 |
| 2002/0191409 | A1* | 12/2002 | Deline et al. | 362/494 |
| 2003/0002179 | A1* | 1/2003 | Roberts et al. | 359/838 |
| 2005/0248863 | A1* | 11/2005 | Kawanishi | 359/877 |

FOREIGN PATENT DOCUMENTS

| DE | 197 19 192 A1 | 11/1998 |
|---|---|---|
| DE | 199 38 396 A1 | 3/2001 |

\* cited by examiner

*Primary Examiner*—Dean A. Reichard
*Assistant Examiner*—Dameon E. Levi
(74) *Attorney, Agent, or Firm*—Mark W. Croll; Paul F. Donovan

(57) ABSTRACT

A power distribution system is provided for an automobile mirror assembly or the like, and includes a flexible membrane having electrical traces electrically connected to the vehicle electrical system, and connecting sites for electrically connecting to various power consumers in the mirror assembly.

24 Claims, 3 Drawing Sheets

POWER DISTRIBUTION SYSTEM

CROSS-REFERENCE TO RELATED APPLICATION

This application claims benefit to U.S. provisional application Ser. No. 60/309,011, filed on Jul. 31, 2001.

FIELD OF THE INVENTION

The present invention relates to electrical systems in automobiles and the like, and, more particularly, to remote parts of the electrical system such as the multi-function electrical system in an electrically powered or electrically operated mirror, and the manner of distributing electrical power for the operation of each such function.

BACKGROUND OF THE INVENTION

In known automobile electrical systems, complicated wiring harnesses are routed throughout the automobile, to provide power for the ever-increasing number of electrical functions. The trend in the industry is to add additional safety and convenience features to the automobile, many of which require electric power input.

Within even relative small features of an automobile, electrical system requirements can be complicated. For example, in exterior mirrors of some car designs, as many as thirteen individual wires can be required for the multiple functions associated with the new electronic mirrors. Common mirror functions, and the operators therefore functioning as electric consumers, include: mirror position adjustment with motor packs, electronic dimming of reflected light from lights of vehicles to the rear by the use of electrochromic cells, turn signal indicators in the mirror housing, memory functions for mirror positioning of multiple drivers, mirror tilt down for reverse transmission gearing, mirror heaters/defrosters, antennas, power folding of the mirrors particularly on European models, and the like.

In known electrical systems for multifunction exterior mirrors, actuators and/or controllers are positioned within the automobile doors, and a wiring harness is routed through the door into the mirror housing. Individual wires from the wire harness are routed throughout the mirror structure to the various electrical consumers associated with each of the functions. With numerous individual wires in the harnesses, multiple connectors are required, and the procedures for making the connections during assembly of the mirror are complicated and time consuming to perform. As more and more mirror functions are built into the mirrors, more and more connectors are required, increasing the possibility of a connector failure. Routing each wire properly, to avoid interference with physically moving components of the mirror, becomes more and more challenging for designers. Designers are faced with the difficulty of incorporating new and changing features with limitations on space and power availability.

It is desirable to reduce weight wherever possible in automotive designs, for the added benefits of fuel economy. Reduction in the use of wires, connectors, solder and materials and processes known to have detrimental environmental effects is also striven for. Many of these goals have been contradictory, such as increasing electrical convenience and safety functions, while reducing the use of wires, connectors and solder.

Printed circuitry techniques are known, including the printing of mirror heaters for automobiles. Printing electrical conductors on flexible material is known, to replace more expensive wires as discrete connecting elements between power supplies and electrical consumers.

A need exists to simplify electrical systems for automobiles, particularly in the relatively compact environments such as exterior mirror housings, while still incorporating a wide variety of electrical functions, with differing power demands.

SUMMARY OF THE INVENTION

The present invention uses the backing layer of a printed circuit for a mirror heater to print additional circuits functioning as an electrical buss for distributing electrical power in the mirror assembly. The actuator can be placed in the mirror housing, and a flexible printed conductor connects the actuator to the printed heater circuit backing member. A simple three-wire connection can be made from the electrical supply source to the actuator, with individual connections from the various consumers to the printed mirror circuit.

In one aspect thereof, the present invention provides an electrical power distribution system for a plurality of electric power consumers in an automobile, with a housing, a power center and an electric power supply source connected to the power center. The electrical power supply source includes a flexible substrate and a plurality of circuit traces on the substrate, each having a connection site for connecting to one of the consumers.

In another aspect thereof, the present invention provides an electric power distribution system, with a power center, an electric power source electrically connected to the power center and a flexible power distributing unit. The distributing unit includes a substrate layer and a conductive layer applied on the substrate layer, the conductive layer including a plurality of traces connected to the power center, each trace each having a connecting site for electrically connecting to the power consumers.

In yet another aspect thereof, the present invention provides an automobile exterior mirror assembly with a mirror pod adapted for connection to an automobile body, a mirror and plurality of electrical consumers associated with the mirror disposed in the pod. A power center is provided in the pod, and is adapted for electrical connection to a power source. A flexible power distributing unit is connected to the power center. The power distributing center has a flexible substrate and a plurality of electrically conductive traces emanating thereon, and a connection site on each trace for connecting to consumers.

An advantage of the present invention is the simplification of an electrical system for an automobile, by reducing the number of wires and connectors required.

Another advantage of the present invention is simplifying the assembly of multi-function automobile exterior rear view mirror systems.

Still another advantage of the present invention is reducing installed costs for automobile exterior mirror units.

Yet another advantage of the present invention is reducing the weight of mirror units.

A further advantage of the present invention is eliminating and/or shortening required wire runs and reducing the number of connectors used for automobile exterior mirrors.

Other features and advantages of the invention will become apparent to those skilled in the art upon review of the following detailed description, claims and drawings, in which like numerals are used to designate like features.

Figure 1:
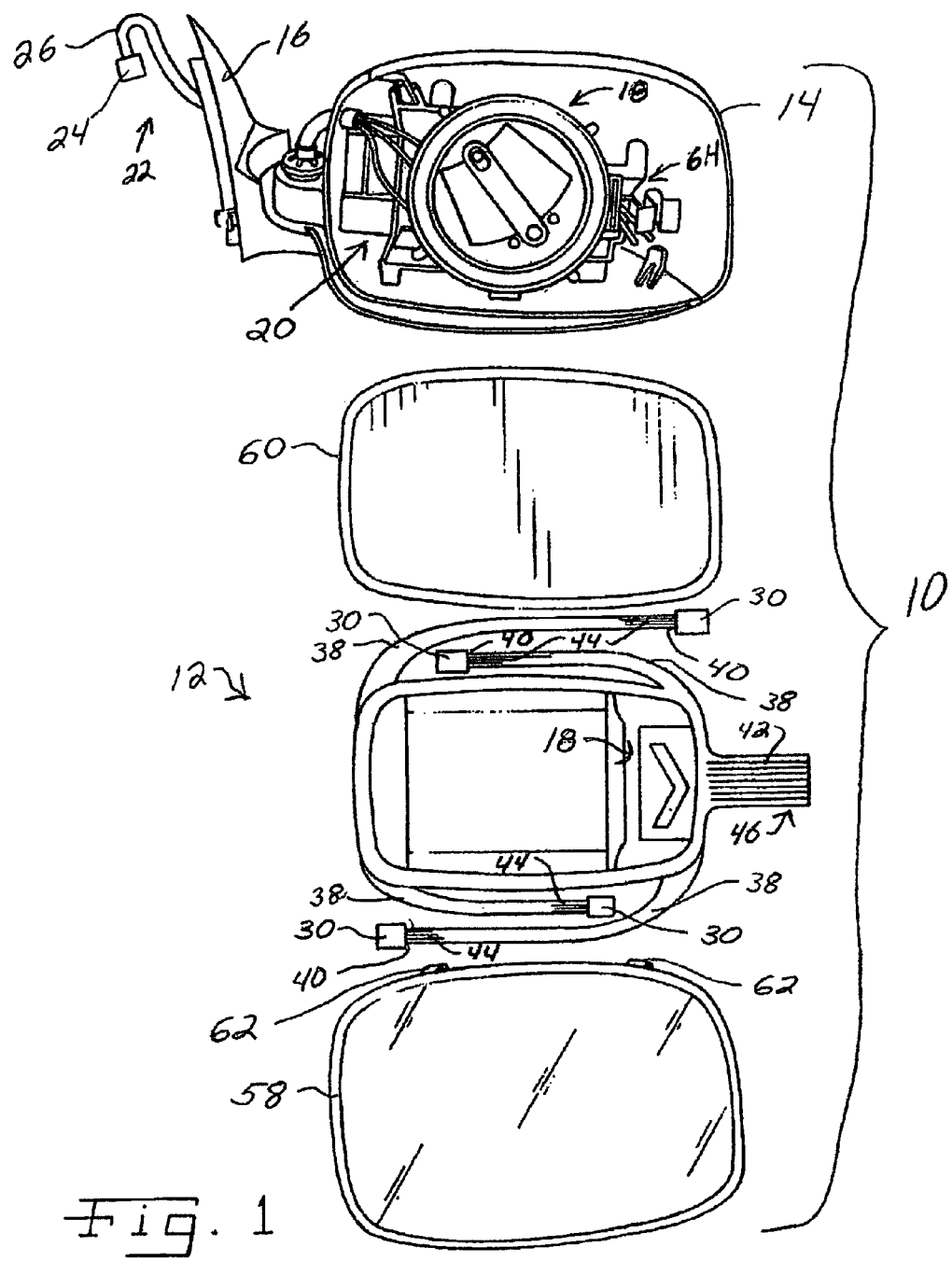
FIG. 1 is an exploded view of an automobile mirror assembly, including a heater element with integrated power feeds in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof.

DETAILED DESCRIPTION OF THE PREFERRED EMBODIMENT

Referring now more specifically to the drawings, and to FIG. 1 in particular, an automobile exterior mirror assembly 10 is shown, which includes an electrical power distribution system 12 in accordance with the present invention. It should be understood that use of the present invention is not limited to automobile mirrors, and distribution system 12 is merely one advantageous configuration in which the present invention can be practiced.

Mirror assembly 10 includes a mirror pod or housing 14 having a leg 16 by which assembly 10 is fastened to an automobile body (not shown), in known manner. The size, style and shape of mirror assembly 10 will vary, from one automobile to another. In conjunction therewith, as will be evident from the description to follow, the size, shape and configuration of distribution system 12 will also vary, in part dependent upon the style of mirror assembly 10, but also dependent upon the number and type of electrically controlled and operated features in mirror assembly 10. Such features, or electrical power consumers 18 may include, for example, a drive mechanism power consumer 18 for controlling the angular positioning of the mirror in housing 14. Another power consumer 18 may be a turn signal indicator power consumer 18. Those skilled in the art will recognize that mirror assembly 10 can include a variety of other power consumers 18, as discussed previously herein.

In a simple form thereof, the present invention includes a controller or power center 20 having an electrical connection 22 to the vehicle 12-volt power source. Connection 22, for example, can be a simple three-conductor connection having a plug 24 on a wire 26 that is connected to the vehicle power source (not shown). A flexible power distributing unit 28 (FIG. 2) is electrically connected to power center 20, and includes a plurality of connection sites 30 to which various power consumers 18 are connected.

Power distributing unit 28 includes a substrate 32 (see FIG. 2) of sheet-like, preferably, flexible material. Substrate 32 has a main body 34 with a plurality of edges 36, and connection sites 30 can be provided along edges 36. Alternatively, to bring connection sites 30 closer to power consumers, substrate 32 can be provided with one or more arms 38 (FIG. 1) radiating therefrom, with connection sites 30 positioned along or at ends 40 of arms 38. The flexibility and length of arms 38 enables the arm to be threaded through and around other components within housing 14, to be connected to a power consumer 18. To distribute electrical current from power center 20 to connection sites 30, for supply to the various electrical consumers 18, substrate 32 is provided with electrically conductive traces 42, 44 applied thereto. Electrically conductive traces 42, 44 can include an electric buss trace 42, and a plurality of distributing traces 44 emanating therefrom. Buss trace 42 is adapted for connection to power center 20, such as via a tail 46 of substrate 32 along which buss trace 42 extends. Each distributing trace 44 ends at a connection site 30, and is adapted and arranged for connection to a power consumer 18 closely located relative to power distributing unit 28.

Different materials are suitable for substrate 32. Advantageously, the material of substrate 32, and particularly arms 38 thereof, has sufficient flexibility that it can be bent or otherwise manipulated as necessary to be routed through and positioned in mirror housing 14. Polyester sheet material, such as Mylar is a suitable material for substrate 32, although other flexible materials also can be used in accordance with the principles of the present invention.

Electrically conductive traces 42 and 44 are applied on a first surface 48 of substrate 32, to provide electrical paths along substrate 32. Traces 42 and 44 can be lines of copper, aluminum, conductive epoxies, or other conductive materials, as those skilled in the art will recognize. Traces 42 and 44 can be applied to substrate 32 by any of the well-known techniques, including, but not limited to, screen printing, pad printing, coating, painting and etching. For simplicity herein, the terms "printing" or "printed" shall be used in reference to the application technique, or circuits made thereby. However, it should be understood that the terms "printing" or "printed" are not meant to limit the manner in which traces 42 and 44 can be applied to substrate 32.

Figure 2:
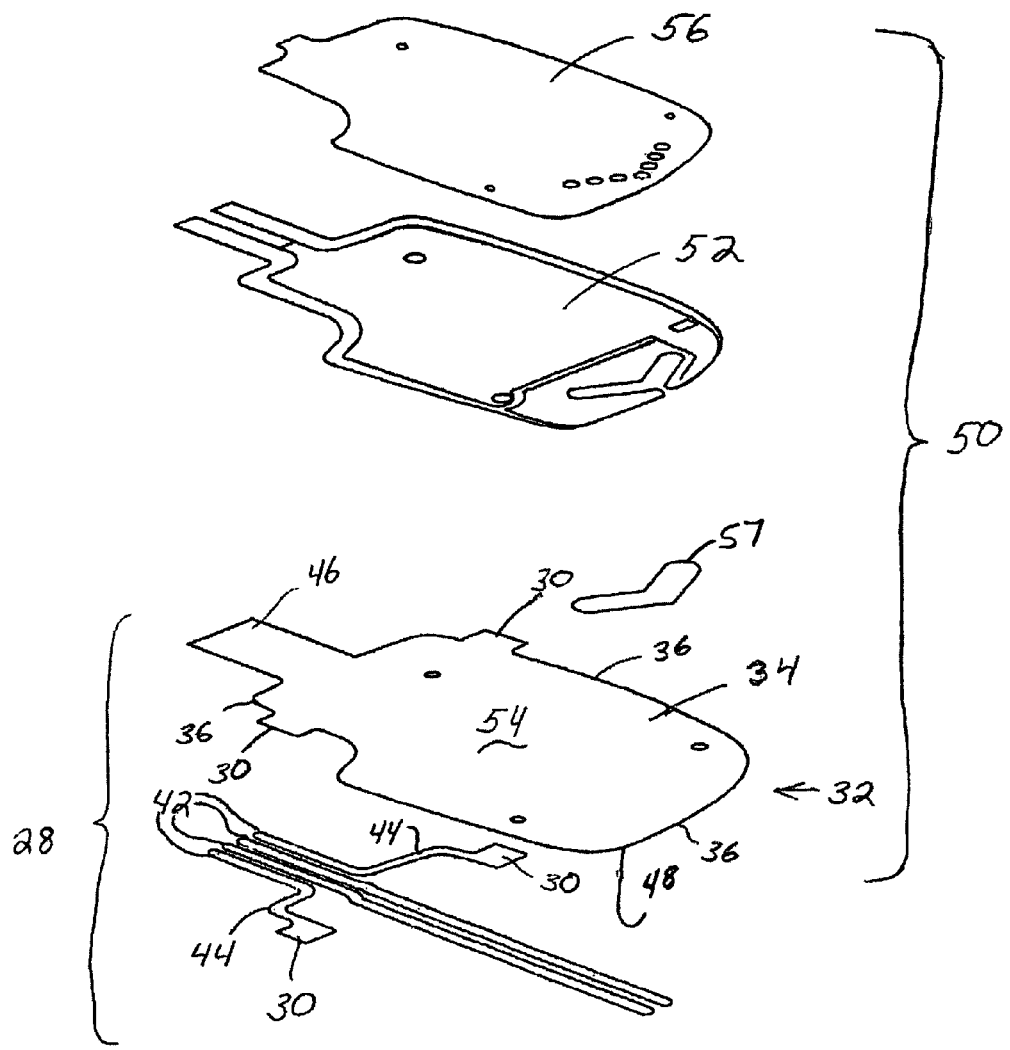
FIG. 2 is an exploded view of a heater element with integrated power feeds similar to that shown in FIG. 1, but configured for an opposite side of an automobile.

As illustrated in FIG. 2, power distributing unit 28 can be incorporated with existing technology for a mirror heater assembly 50. A conductor layer or grid 52 is provided on a second surface 54 opposite first surface 48 of substrate 32. A positive temperature coefficient (PTC) layer 56 is applied thereover. A diffuser device 57 is shown and can be used in conjunction with turn signal indicators. Substrate 32 is sandwiched between a mirror body 58 (FIG. 1) and a backing plate 60 (FIG. 1), and may be secured by a plurality of fastening clips 62 (FIG. 1). The construction and operation of self-regulating PTC heaters for defrosting or demisting automobile exterior mirrors is well known, and will not be described in greater detail herein. In the present invention, the opposite side of a substrate used for the mirror heater is used for the application of traces 42 and 44. Although described as part of a PTC heater, the present invention is capable of use in other heaters, such as, for example, a fixed resistance heater. Alternatively, the principles of the present invention can be used without an associated mirror heater.

The various devices, i.e., consumers 18, to be powered may, and likely will have different electric current requirements. In accordance with the present invention, a single power level is provided to power center 20, and adjustments are made from there on the various printed circuits. Utilizing a printed circuit as an electrical distribution system, the necessary resistors or other current adjusters can be printed into the circuit, using known techniques. Thus, the electrical current to each consumer can be controlled, as necessary, in an efficient, space-saving and cost effective manner.

In an automobile environment, such as exterior mirror assembly 10, it is necessary to keep the electrical components in a sealed environment, to prevent corrosion and the like caused by moisture. In such an environment, in the past it has been necessary to include heat sinks in the circuits, to dissipate heat from temperature sensitive components of the circuit. When provided as part of mirror heater 50, and applied directly onto the back surface of the mirror body 58, the mass of mirror body 58 acts effectively as a massive heat sink.

When not included as part of a mirror heater 50, substrate 32 has only traces 42 and 44 thereon, without conductor layer 52 and PTC layer 56. Advantages are still obtained if substrate 32 is applied to the back of mirror body 58 in that substrate 32 acts as an anti-shatter membrane for mirror 58, and mirror 58 functions as a heat sink.

During the assembly of mirror assembly 10, substrate 32, with conductive traces 42 and 44, conductor layer 52 and PTC layer 56 thereon is applied to mirror body 58, and secured thereto and to backing plate 60 by clips 62. Tail 46 and the electrical conductors thereon, are connected to a connector 64 (FIG. 1) of power center 20. Connection sites 30 are connected to the various power consumers 18.

The various connectors used can be of any suitable construction, including, but not limited to, plug-in type connectors, solder connectors, crimp connectors, pressure-type connectors, conductive epoxy connectors, and other types of connecting structures.

Figure 3:
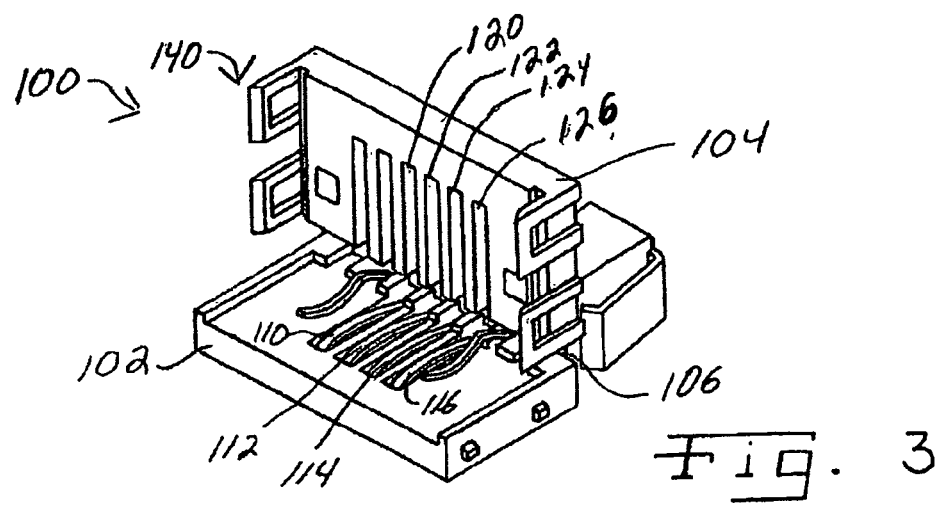
FIG. 3 is an enlarged view of a connector for use with the heater element with integrated power feeds, the connector shown open, without a power feed secured thereto.
Figure 4:
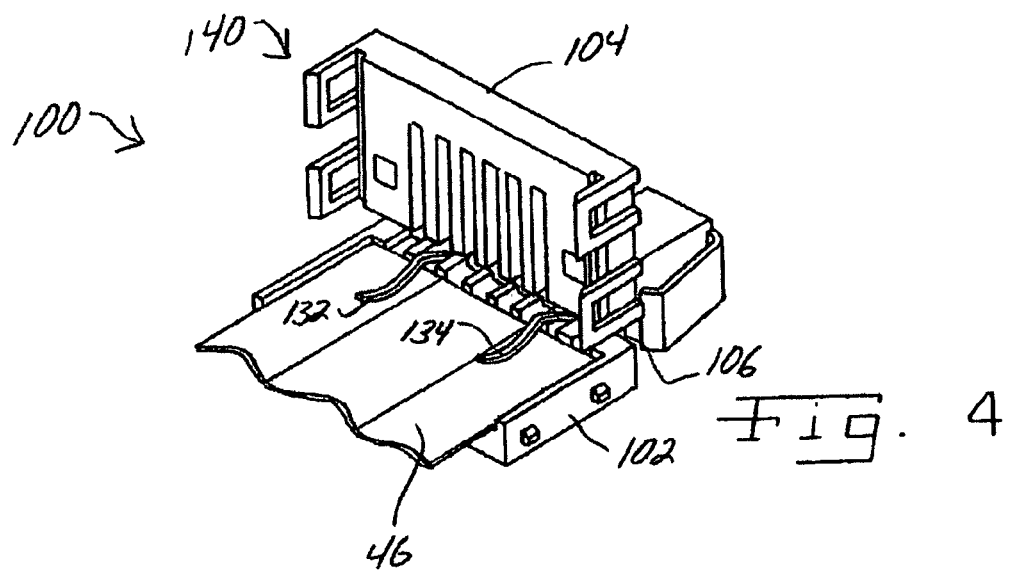
FIG. 4 is an enlarged view of the connector shown in FIG. 3, but illustrating a power feed from the heater element positioned in the connector for connection thereto.
Figure 5:
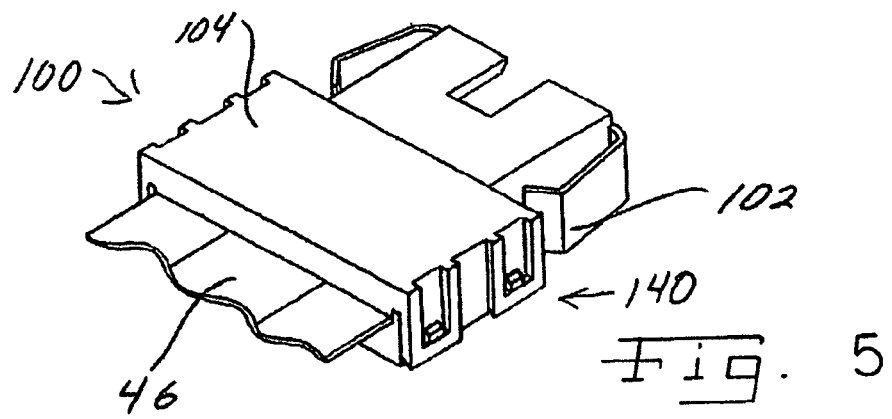
FIG. 5 is an enlarged view of the connector in a closed position, connected to the power feed.

FIGS. 3-5 illustrate an electrical connector 100 that may be used with the present invention. In a preferred design, connector 100 is of a one piece, molded construction, but can be of other configurations and constructions. Connector 100 includes a base 102 and a top 104 connected to each other by a hinge 106. Top 104 can be moved between an open position, illustrated in FIGS. 3 and 4, and a closed position illustrated in FIG. 5. In a preferred design, hinge 106 is a so-called living hinge, as those skilled in the art will understand readily; however, hinge 106 can be of constructions other than the living hinge shown. A plurality of electrical contacts 110, 112, 114, 116 is provided in base 102, one contact for each of the electrical traces to which connector 100 is to be connected. In the exemplary embodiment of FIGS. 3-5, connector 100 includes four electrical contacts 110, 112, 114, 116; however, it should be understood that connector 100 can include more or fewer contacts.

Each contact 110, 112, 114, 116 is positioned adjacent and in line with a mating recess 120, 122, 124, 126 provided in top 104, into which the contact can be inserted. Each contact 110, 112, 114, 116 further may include a plurality of contact points, to ensure good electrical connection with a trace 42, 44 positioned therewith.

If used, for example, as a connector with tail 46, connector 100 can include a pair of protruding hold down members 132, 134 on base 102. During installation and connection of connector 100 to tail 46, Tail 46 is inserted between contacts 110, 112, 114, 116 and hold down members 132, 134. Top 104 is lowered onto base 102, with tail 46 properly positioned therein. Top 104 is secured to base 102 by a pair of snap locks 140 operatively disposed on opposite sides of connector 100.

Connector 100 can be sealed or unsealed, and polarized or not. Contact surfaces of connector 100 can be modified, such as by roughening, to ensure more intimate contact and connection.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An electrical power distribution system for a plurality of electric power consumers in an automobile, comprising:
   a power center;
   an electrical connection from said power center adapted for electrical connection to an electrical power source; and
   an electrical power distributing unit electrically connected to said power center, and including:
   a flexible substrate; and
   a plurality of circuit conductive traces on said substrate, each having a connection site for connecting to one of the consumers, said conductive traces including a buss trace adapted for connection to said power center and a plurality of distributing traces emanating from said buss trace.

2. The electrical power distribution system of claim 1, including a housing comprising an external mirror pod containing said power center and said distributing unit.

3. The electrical power distribution system of claim 2, wherein each said consumer is disposed in said housing.

4. The electrical power distribution system 2, said substrate having a mirror heater thereon.

5. The electrical power distribution system 4, wherein each said consumer is disposed in said housing.

6. The electric power distribution system of claim 1, said substrate having a mirror heater thereon.

7. The electric power distribution system of claim 1, said traces applied by one of screen printing, pad printing, coating, painting, and etching.

8. The electrical power distribution system 1, said traces comprising one of copper, aluminum and conductive epoxy.

9. The electrical power distribution system of claim 1, said substrate including at least one elongated flexible arm, with at least one connection site at an end of said at least one arm.

10. The electrical power distribution system of claim 1, said substrate including a plurality of edges, with at least one connection site provided along at least one edge of said plurality of edges.

11. An electric power distribution system, comprising:
    a power center;
    an electrical connection from said power center adapted for electrical connection to a power source; and
    a flexible power distributing unit including:
    a substrate having first and second surfaces; and
    a conductive layer applied on one said surface of said substrate, said conductive layer including a plurality of traces having a buss trace connected to said power center, a plurality of distributing traces emanating from said buss trace, and each said trace each having a connecting site for electrically connecting to a power consumer.

12. The electric power distribution system of claim 11, said conductive layer applied by one of screen printing, pad printing, coating, painting, and etching.

13. The electric power distribution system of claim 11, including a PTC heater applied on said second surface of said substrate.

14. The electric power distribution system of claim 13, said conductive layer applied by one of screen printing, pad printing, coating, painting and etching.

15. The electric power distribution system of claim 14, said conductive layer comprising one of copper, aluminum and conductive epoxy.

16. The electric power distribution system of claim 11, said conductive layer comprising one of copper, aluminum and conductive epoxy.

17. An automobile exterior mirror assembly, comprising:
   a mirror pod adapted for connection to an automobile body;
   a mirror body and a plurality of electrical consumers associated with said mirror body disposed in said pod;
   a power center disposed in said pod, said power center adapted for electrical connection to a power source; and
   a flexible power distributing unit connected to said power center, said power distributing center having a flexible substrate and a plurality of electrically conductive traces disposed thereon, each said trace being electrically connected to and emanating from a buss trace that is electrically connected to said power center; and
   a connection site on each said trace for connecting to said consumers.

18. The automobile exterior mirror assembly of claim 17, said substrate attached to said mirror body.

19. The automobile exterior mirror assembly of claim 17, said substrate having a first surface and a second surface, said traces disposed on one said surface and a mirror heater disposed on the other said surface.

20. The automobile exterior mirror assembly of claim 19, said traces applied by one of screen printing, pad printing, coating, painting and etching.

21. The automobile exterior mirror assembly of claim 20, said traces comprising one of copper, aluminum and conductive epoxy.

22. The automobile exterior mirror assembly of claim 21, said substrate being mylar.

23. The automobile exterior mirror assembly of claim 17, said substrate having a main body and an elongated arm extending from said main body; a trace from said main body extending along said arm and a connection site on said arm.

24. The automobile exterior mirror assembly of claim 17, said substrate having edges, and connection sites disposed along said edges.

* * * * *